(12) United States Patent
Drenckhahn et al.

(10) Patent No.: US 9,768,480 B2
(45) Date of Patent: Sep. 19, 2017

(54) STACK FOR AN ELECTRICAL ENERGY ACCUMULATOR

(71) Applicant: Siemens Aktiengesellschaft, Munich (DE)

(72) Inventors: Wolfgang Drenckhahn, Erlangen (DE); Horst Greiner, Forchheim (DE); Johann Rothfischer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 421 days.

(21) Appl. No.: 14/373,315

(22) PCT Filed: Jan. 11, 2013

(86) PCT No.: PCT/EP2013/050443
§ 371 (c)(1),
(2) Date: Jul. 18, 2014

(87) PCT Pub. No.: WO2013/110506
PCT Pub. Date: Aug. 1, 2013

(65) Prior Publication Data
US 2015/0010834 A1 Jan. 8, 2015

(30) Foreign Application Priority Data
Jan. 25, 2012 (DE) .................. 10 2012 201 069

(51) Int. Cl.
| | | |
|---|---|---|
| *H01M 12/08* | (2006.01) | |
| *H01M 8/0202* | (2016.01) | |
| *H01M 8/04089* | (2016.01) | |
| *H01M 8/2483* | (2016.01) | |
| *H01M 8/2432* | (2016.01) | |

(Continued)

(52) U.S. Cl.
CPC ......... *H01M 12/08* (2013.01); *H01M 8/0202* (2013.01); *H01M 8/04089* (2013.01); *H01M 8/18* (2013.01); *H01M 8/2432* (2016.02); *H01M 8/2483* (2016.02); *H01M 8/0606* (2013.01); *H01M 2220/10* (2013.01); *H01M 2300/0074* (2013.01); *Y02E 60/128* (2013.01)

(58) Field of Classification Search
None
See application file for complete search history.

(56) References Cited

U.S. PATENT DOCUMENTS

| | | |
|---|---|---|
| 7,867,665 B2 | 1/2011 | Minamiura et al. |
| 8,956,770 B2 | 2/2015 | Sala et al. |
| 9,005,826 B2 | 4/2015 | Landes et al. |

(Continued)

FOREIGN PATENT DOCUMENTS

| | | |
|---|---|---|
| CN | 100544091 C | 9/2009 |
| CN | 101689670 A | 3/2010 |

(Continued)

*Primary Examiner* — Sarah A Slifka
*Assistant Examiner* — Haroon S Sheikh
(74) *Attorney, Agent, or Firm* — Beusse Wolter Sanks & Maire

(57) ABSTRACT

A stack for an electrical energy accumulator is provided having at least one storage cell, which in turn has a storage electrode and an air electrode that is connected to an air supply device, the air supply device having an air distribution plate, wherein the stack also has a water vapor supply device which is in contact with the storage electrode and the air distribution plate has at least one element of the water vapor supply device.

5 Claims, 10 Drawing Sheets

(51) Int. Cl.
*H01M 8/18* (2006.01)
*H01M 8/0606* (2016.01)

(56) References Cited

U.S. PATENT DOCUMENTS

2007/0202385 A1 8/2007 Minamiura et al.
2013/0034784 A1 2/2013 Landes

FOREIGN PATENT DOCUMENTS

| DE | 102009057720 A1 | 6/2011 |
| JP | 2012129031 A | 7/2012 |
| JP | 2013513910 A | 4/2013 |
| WO | 2011052283 A | 5/2011 |
| WO | 2011052283 A1 | 5/2011 |
| WO | 2011070006 A1 | 6/2011 |
| WO | 2012026219 A | 3/2012 |
| WO | 2012026219 A1 | 3/2012 |

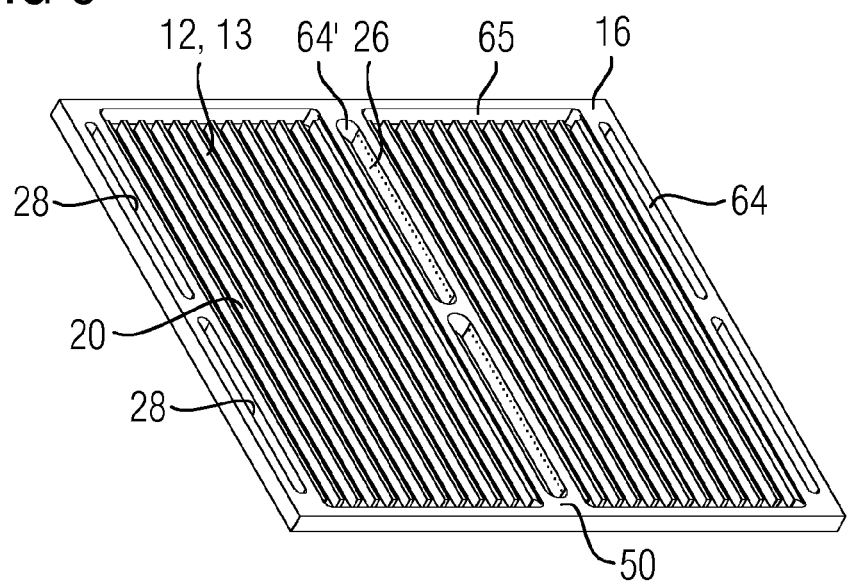
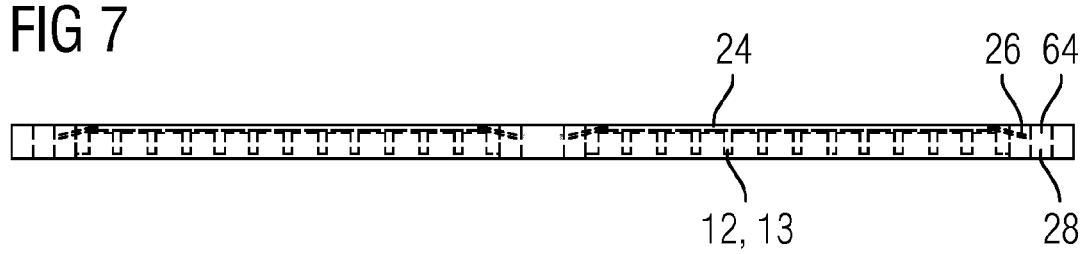

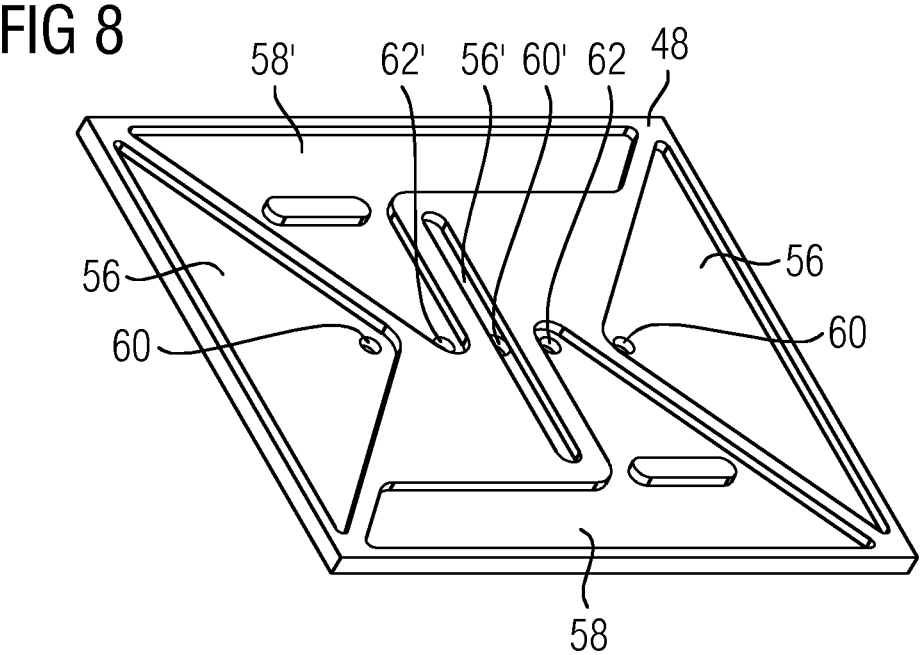
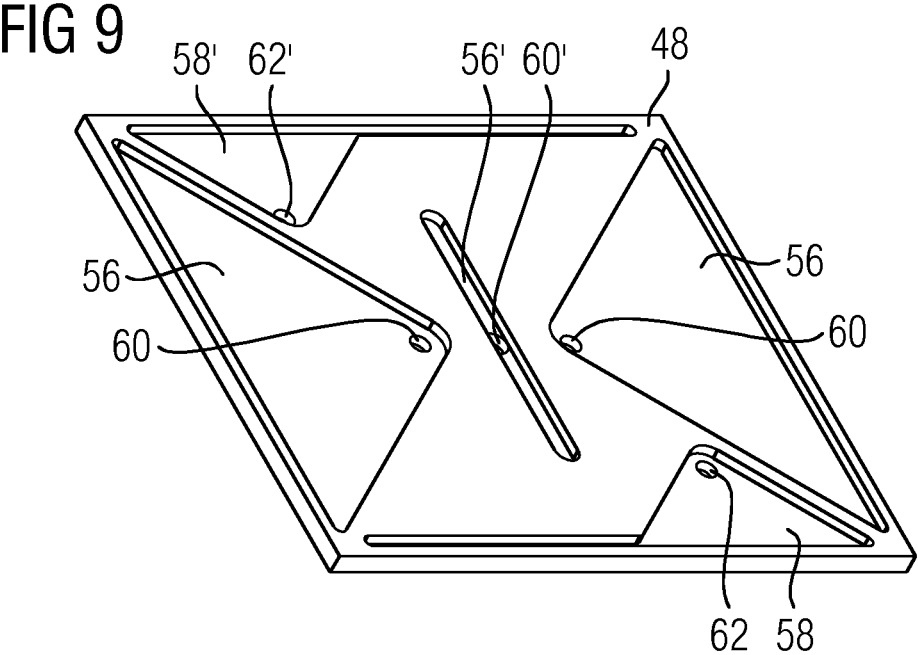

STACK FOR AN ELECTRICAL ENERGY ACCUMULATOR

CROSS REFERENCE TO RELATED APPLICATIONS

This application is the US National Stage of International Application No. PCT/EP2013/050443 filed Jan. 11, 2013, and claims the benefit thereof. The International Application claims the benefit of German Application No. DE 102012201069.6 filed Jan. 25, 2012. All of the applications are incorporated by reference herein in their entirety.

FIELD OF INVENTION

The invention relates to a stack for an electrical energy accumulator.

BACKGROUND OF INVENTION

A variety of technical alternatives are employed in order to store excess electric current which is produced, for example, when current is generated by renewable energy sources or by power plants which are operated in the region of the optimum degree of efficiency and for which there is temporarily no requirement in the power supply system. One of said alternatives is the rechargeable oxide battery (ROB). ROBs are usually operated at temperatures of between 600° C. and 800° C. and, in the process, oxygen which is supplied to an air electrode of the electrical cell is converted into oxygen ions, transported by a solid-body electrolyte and moved to the opposite storage electrode. A redox reaction takes place there, said redox reaction receiving or generating an electric current depending on whether a charging or discharging process is taking place. Owing to the high temperatures required for this process, the selection of material for the cell materials used and construction of the cell components and also the arrangement of the storage medium is highly complex. In particular, the individual components are adversely affected after several redox cycles which are run at said operating temperatures.

SUMMARY OF INVENTION

An object of the invention is therefore to provide an electrical energy accumulator based on an ROB, which electrical energy accumulator, in comparison to the prior art, ensures a design of a stack or of a storage cell which is cost-effective, simple in respect of assembly and temperature-resistant.

This object is achieved with an electrical energy accumulator as claimed.

The stack for an electrical energy accumulator according to embodiments herein comprises at least one storage cell which, in turn, comprises a storage electrode (negative electrode) and an air electrode (positive electrode). The air electrode is connected to an air supply apparatus in this case, wherein the air supply apparatus comprises an air distribution plate. The stack according to the invention is distinguished in that the stack additionally comprises a water vapor supply apparatus which is in contact with the storage electrode, and in that the air distribution plate additionally comprises at least one element of the water supply apparatus.

The advantage of the present invention is that an air distribution plate at the same time comprises a water vapor supply apparatus. That is to say, the air distribution system and the water vapor distribution system are joined and integrated in one component. This leads to a clear simplification of the assembly of the stack. The expenditure on assembly can be considerably reduced as a result. Furthermore, the installation space required is also considerably reduced. This leads to more energy being able to be stored per unit volume of the required installation space. The electrical energy accumulator can therefore be produced in a more cost-effective manner and requires less space.

In another embodiment of the invention, the air distribution plate has at least two recesses which are separate from one another and which are each provided with a hole for supplying working medium or discharging working medium. The separate recesses serve either to supply air or to supply water vapor. Said recesses are therefore a constituent part of the air supply apparatus or of the water vapor supply apparatus. In this case, working medium refers very generally to the supply of the required air or the required water vapor, but working medium can also include flushing gases such as nitrogen or a nitrogen/water vapor mixture; different working media are conducted through the holes into the air supply apparatus or into the water vapor supply apparatus depending on the process state. In this case, it may be expedient for both the air supply apparatus and also the water vapor supply apparatus to each have two recesses with holes in the air distribution plate, wherein one of the respective recesses serves to supply working medium and the other recess serves to discharge working medium.

In a further advantageous embodiment of the stack, said embodiment additionally has a bottom plate and at least one so-called interconnector plate (integrated component). In this case, both the bottom plate and also the interconnector plate or the integrated component each have at least two vertically continuous cutouts which, when the plates are stacked, each form at least one air channel and at least one water vapor channel in the assembled stack.

In this case, in each case one recess in the air distribution plate is connected to the air channel, and the second recess in the air distribution plate is connected to the water vapor channel.

In principle, it is expedient when at least two water vapor channels are provided, said water vapor channels being connected to in each case one recess in the air distribution plate. Said water vapor channels in this case are, in particular, a water vapor channel for supplying water vapor, and a water vapor channel for discharging water vapor.

A top plate is further preferably provided, said top plate being connected to an air electrode. Said top plate is a termination plate of the stack which in turn preferably has recesses which are connected to the air channel and at least one hole of which leads to a channel which is in direct contact with the air electrode. This arrangement leads to the top plate, that is to say the termination plate of the stack, being used to route the channel for supplying air across the air electrode and therefore to reroute said channel and deflect said channel back to the air distribution plate again in a further channel.

Further embodiments and further features of the invention will be described in greater detail with reference to the following figures. Features with the same designation but in different embodiments are provided with the same reference symbols in this case. The embodiments are purely exemplary embodiments which do not limit the scope of protection.

BRIEF DESCRIPTION OF THE DRAWINGS

In the drawings:

FIG. 6 shows an integrated component looking at the storage side, FIG. 7 shows a cross-sectional illustration of the integrated component, FIG. 8 shows a plan view of an air distribution plate having an air and water supply apparatus, FIG. 9 shows an alternative embodiment of the air distribution plate according to FIG. 8.

DETAILED DESCRIPTION OF INVENTION

Figure 1:
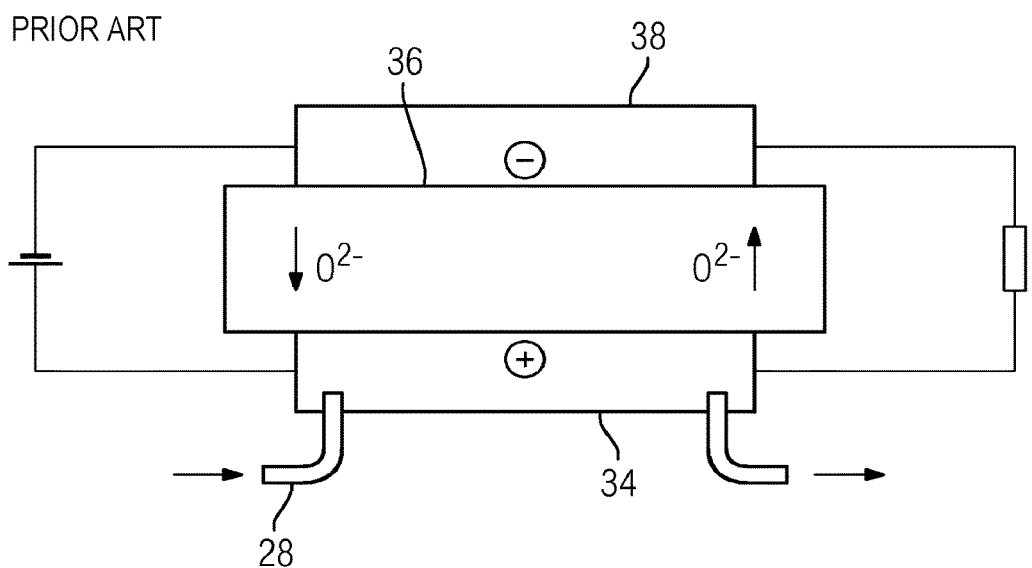
FIG. 1 shows a schematic illustration of the manner of operation of an ROB.

The manner of operation of an ROB will be described in a schematic manner with reference to FIG. 1 in as much as this is necessary for the following description of the invention. A conventional design of the ROB involves a process gas, in particular air, being let in via a gas supply 28 across a positive electrode, wherein oxygen is drawn from the air. For this reason, the positive electrode is called the air electrode in the text which follows. The oxygen, in the form of oxygen ions ($O^{2-}$), passes through a solid electrolyte 36, which is present at the positive electrode, to a negative electrode 38. A storage medium in the form of a porous material, which is present in elemental form or in oxide form depending on the state of operation (charging/discharging), is arranged at the negative electrode, said porous material containing a functionally active oxidizable material, in particular a metal, for example iron. For this reason, the negative electrode is also called the storage electrode, with this term being used in the text which follows.

The oxygen ions which are transported through the solid-body electrolyte are transported or drawn through pore channels in a porous body, which serves as the storage medium, to the oxidizable material, that is to say to the metal, by means of a redox pair, for example $H_2/H_2O$, which is gaseous in the operating state of the battery. Depending on whether a charging or discharging process is being performed, the metal or metal oxide is oxidized or reduced and the oxygen which is required for this purpose is delivered by the gaseous redox pair $H_2/H_2O$ or transported back to the solid-body electrolyte (this mechanism is called a shuttle mechanism).

Figure 2:
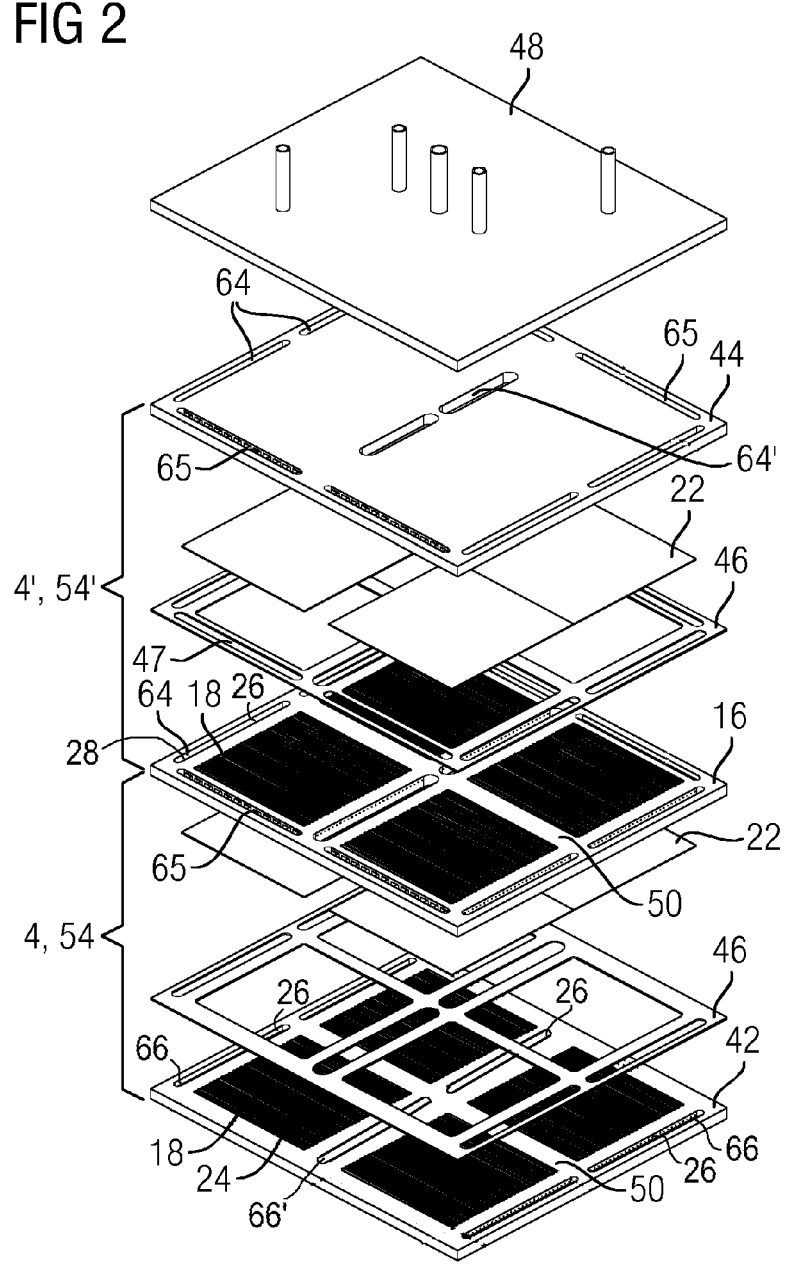
FIG. 2 shows an exploded illustration for designing a stack in an ROB.
Figure 3:
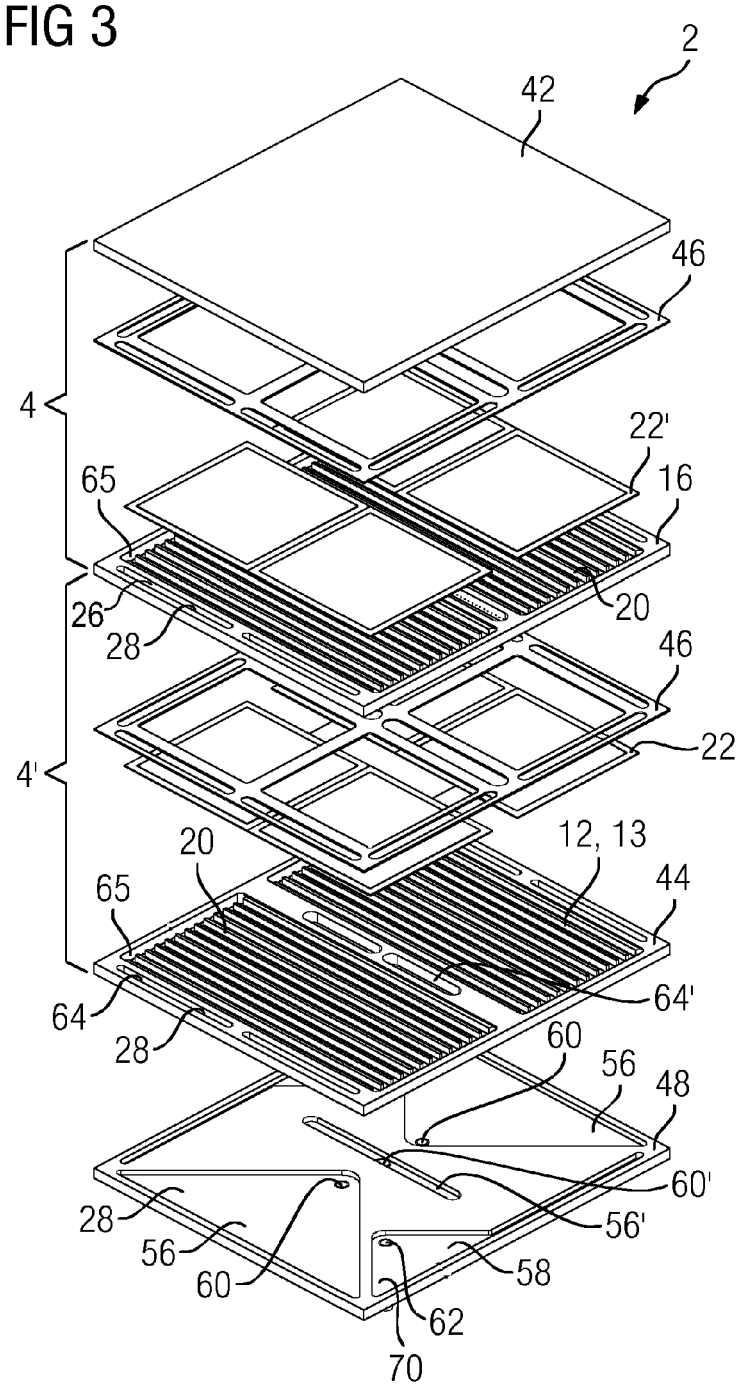
FIG. 3 shows the exploded illustration from FIG. 2, in an opposite viewing direction.

The design of a stack, which once again is a constituent part of the electrical energy accumulator in its entirety, wherein a plurality of stacks are generally combined for this purpose, will now be described with reference to FIGS. 2 and 3. The exploded illustration in FIG. 2 is constructed in such a way that the view is directed at an air supply side 18 of the respective storage cell 4, wherein a storage side 20 is respectively concealed. In contrast, FIG. 3 merely shows a view of FIG. 2 rotated through 180°. FIG. 3 shows, in a view from the bottom to the top, an assembly order which is advantageous from a production point of view. The individual components will be explained from bottom to top below with reference to FIG. 2. A top plate 42 is first provided, channels 24 for the air supply being made on said top plate. That side of the electrical storage cell 4 which is visible with respect to the top plate 42 is called the air supply side 18. The top plate 42 has a planar face 50 on which a seal 46 is placed. The seal 46 comprises, for example, a glass film which has the requisite seal properties at the corresponding temperatures between 600° C. and 800° C. An electrode structure 22 is placed on the seal 46, wherein the positive electrode 34 points downward to the channels 24 in this case. The manner of operation of the electrode structure will be discussed later in greater detail with reference to FIG. 4.

An integrated component 16 (also called an interconnector plate, with this term being used in the text which follows) is mounted on the electrode structure 22, wherein receptacles 12 for a storage medium 14 in the form of recesses 13 are made in the direction of the electrode structure 22. Said direction is the storage side 20 of the interconnector plate 16 which can be analogously seen in the reversed exploded illustration according to FIG. 3.

The interconnector plate 16 in turn has, on the rear face, an air supply side 18 which is configured analogously to the air supply side 18 of the top plate 42. This air supply side 18 also has a planar face 50 on which, in turn, a seal 46 is fitted, the sensor unit being followed by a further electrode structure 22 and then a bottom plate 44 which in this case in turn has the receptacle 12 for a storage medium 14 in the form of recesses 13.

An air distribution plate 48 is fitted on said bottom plate 44, said air distribution plate serving to let the process gas, specifically the air, into the stack 2.

In this case, the air distribution plate 48 has recesses 56 and 56', said recesses serving to let in (56) or let out (56') the air which serves as process gas. Furthermore, the air distribution plate 48 has recesses 58 and 58' by means of which the water vapor can be routed into the stack 2 and by means of which the water vapor is distributed in the stack 2. Both the recesses 56, 56' and the recesses 58, 58' have holes 60, 60' and 62, 62' which serve to supply working medium. The air and the water vapor or a flushing gas, in particular, serve as working medium. According to FIG. 3, the air distribution plate 48 is followed by a bottom plate 44 which is preferably cohesively connected to said bottom plate by a joining method, in particular by a hot-soldering method. The air distribution plate 48 and the bottom plate 44 therefore form a single joined component in the assembled stack 2. The bottom plate 44 has cutouts 64 and 65 which, as can be seen in the exploded illustration according to FIG. 3, are situated above the respective recesses 56, 56' for the air supply and the recesses 58, 58' for the water supply.

The air which is introduced into the stack by means of the recesses 56 therefore flows upward through the cutouts 64 in the edge region of the bottom plate 44. Said cutouts 64 for the air supply have holes 26 which can be seen in the perspective illustration according to FIG. 2 and, in greater detail, in FIGS. 5 and 7. Said holes 26 serve to introduce the air into channels 24 which are connected to the air electrode 34. The air is therefore branched from the cutouts 64 into the holes 26 and is therefore supplied to the corresponding air electrode 34.

The described direction of flow of the air is merely an example. In principle, the air can also be routed in the opposite direction. It is further possible to generate another air distribution system, should this be necessary for thermal reasons, using the described air distribution plate without considerable technical expenditure and while maintaining the basic advantageous stack design with its relatively simple assembly.

Figure 11:
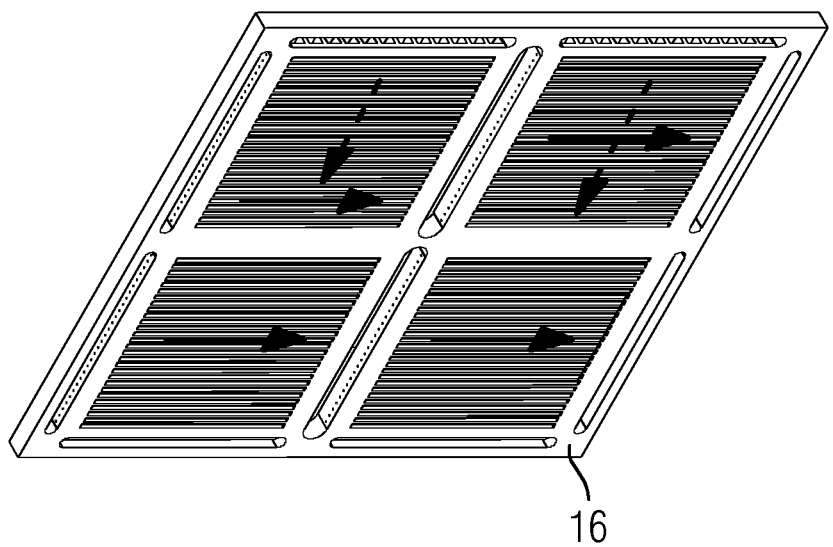
FIGS. 11-16 show different directions of flow of the air supply.
Figure 12:
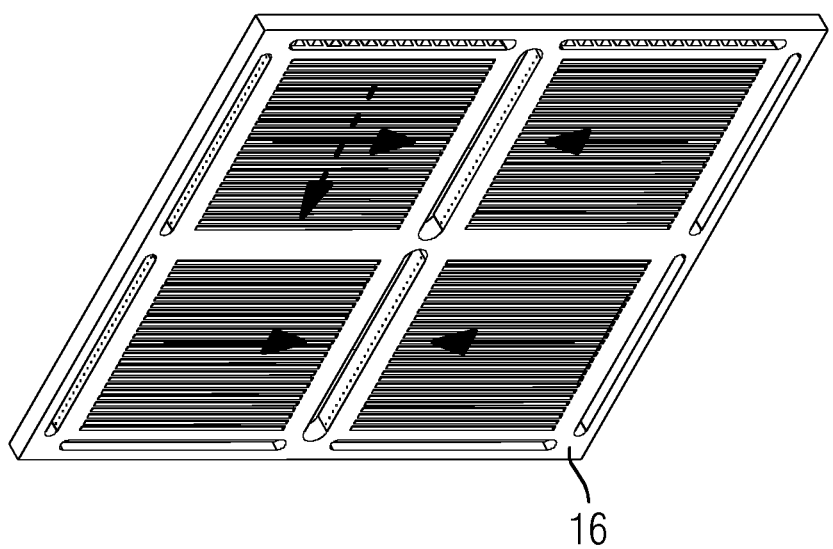
Figure 13:
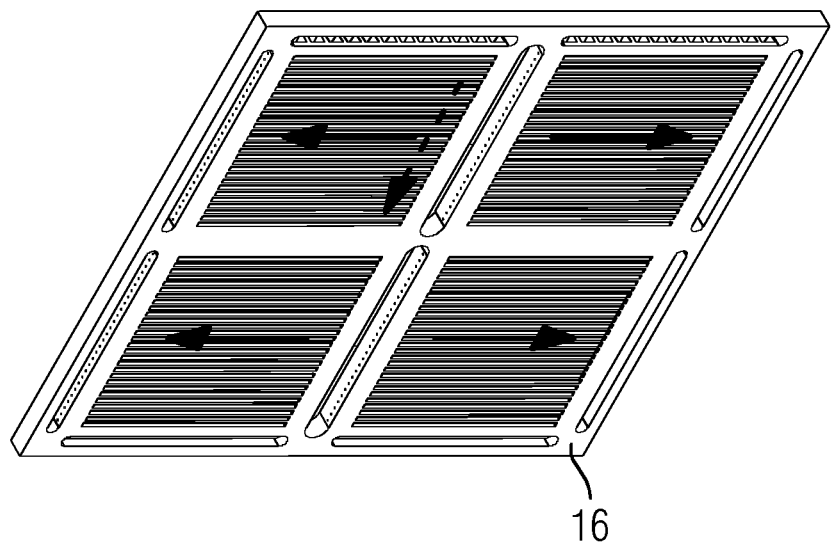
Figure 14:
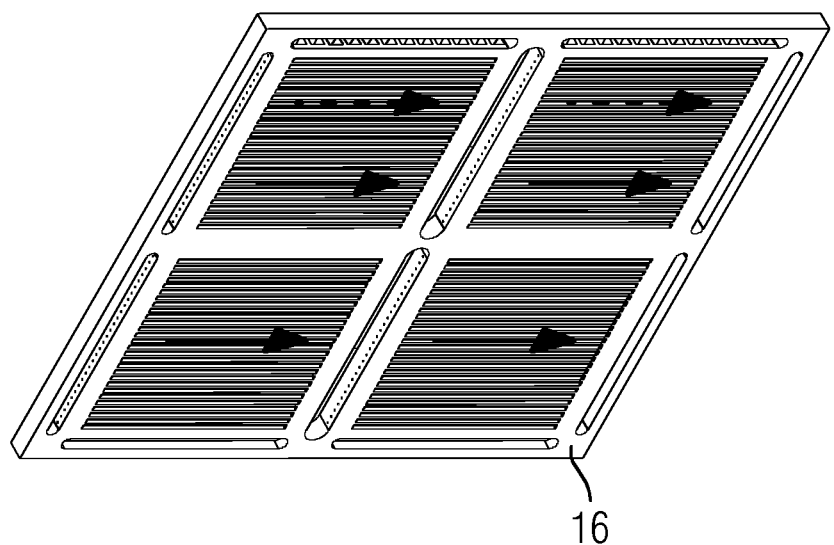
Figure 15:
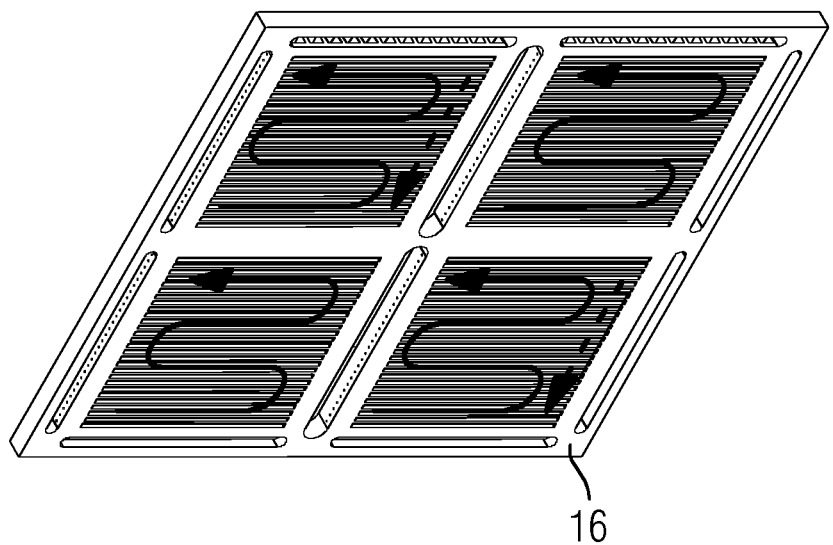
Figure 16:
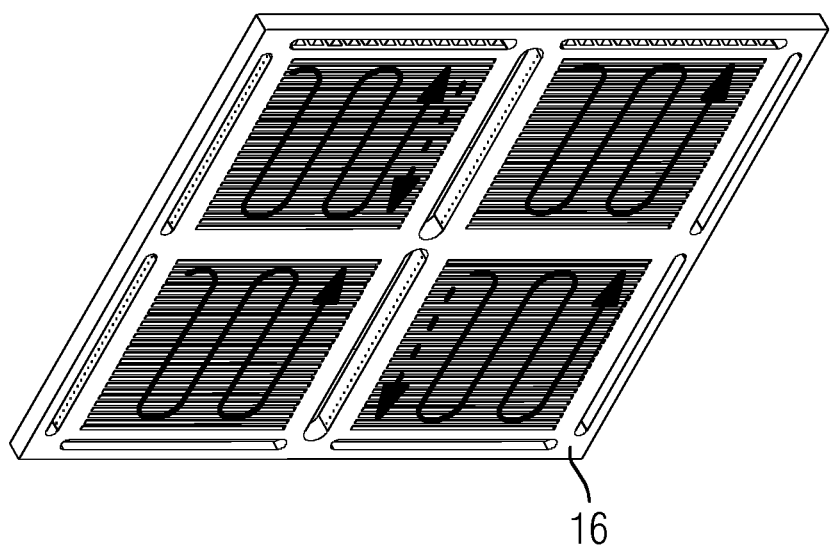

Owing to the chemical reaction which occurs in the cells, the process gas, that is to say the air, also has a considerable temperature gradient over the entire flow profile in unfavorable cases. This temperature gradient can in turn lead to thermal stresses in the individual components, such as the interconnector plate 16 for example. In order to avoid or reduce these thermal stresses, the flow profile of the air is correspondingly adjusted. Various air flow paths can be expedient from a thermal point of view depending on the number of cells 4 and the geometric arrangement of said cells in the individual layer sequences 54, 54'. The described exemplary embodiment basically involves a cross-flow since the direction of the air channels 24 and the direction of the recesses 13 (dashed arrows in FIGS. 11 to 16) for the storage medium 14 run at a 90° angle in relation to one another. This cross-flow can run, for example, as indicated in FIGS. 11 to 13. The opposite to this is a co-current flow if the recesses 13 and the channels 24 were to run in parallel on the interconnector plate 16, as shown in FIG. 14. FIGS. 15 and 16 describe a meandering profile of the air flow which can be guided in co-current flow or countercurrent flow. It goes without saying that the different flow profiles require corresponding adjustments of the components of the water vapor supply apparatus and of the air supply apparatus 28 which are not explicitly illustrated in FIGS. 11 to 16.

The interconnector plate 16 (or the integrated component 16) is fitted over the bottom plate 44, said interconnector plate likewise having cutouts 64, 64' which, together with the cutouts 64 in the bottom plate 44, form an air channel. Since the air channel according to FIGS. 2 and 3 is formed by stacking the cutouts 64 and cannot be seen as a whole, it is not provided with a reference symbol either. Said air channel runs further through the interconnector plate and likewise runs through a seal 46 which, like the bottom plate 44 and the interconnector plate 16, likewise has said respectively congruent cutouts 47 through which the air or the water vapor can flow and which likewise partly form the air channel.

Depending on the configuration of the stack 2, a plurality of interconnector plates 16 can now follow, only one interconnector plate 16 which is then followed by a so-called top plate 42 being depicted in FIGS. 2 and 3 in each case. The top plate 42 in turn has recesses 66 for the air supply apparatus. The recesses 66 in the top plate 42 likewise in turn have holes 26 which lead into channels 24 which are likewise connected to the air electrode 34 of an electrical energy storage cell 4, 4'. The air channel of the stack 2 is therefore constructed in such a way that the air flows past the individual storage cells 4 and is branched through the holes 26 to the respective air electrode 34 of the individual cells 4. In the top plate 42, the air is correspondingly rerouted and routed back to the air distributor plate 48 through recesses 64' which, in this embodiment, are arranged in the center of the respective plate, that is to say the bottom plate 44, the top plate 42 or the interconnector plate 16, and which in turn form an air channel. In said air distributor plate, said recesses and said air channel are connected to the recesses 56' in the air distributor plate and the air is routed out of the stack again by means of the hole 60'.

Figure 4:
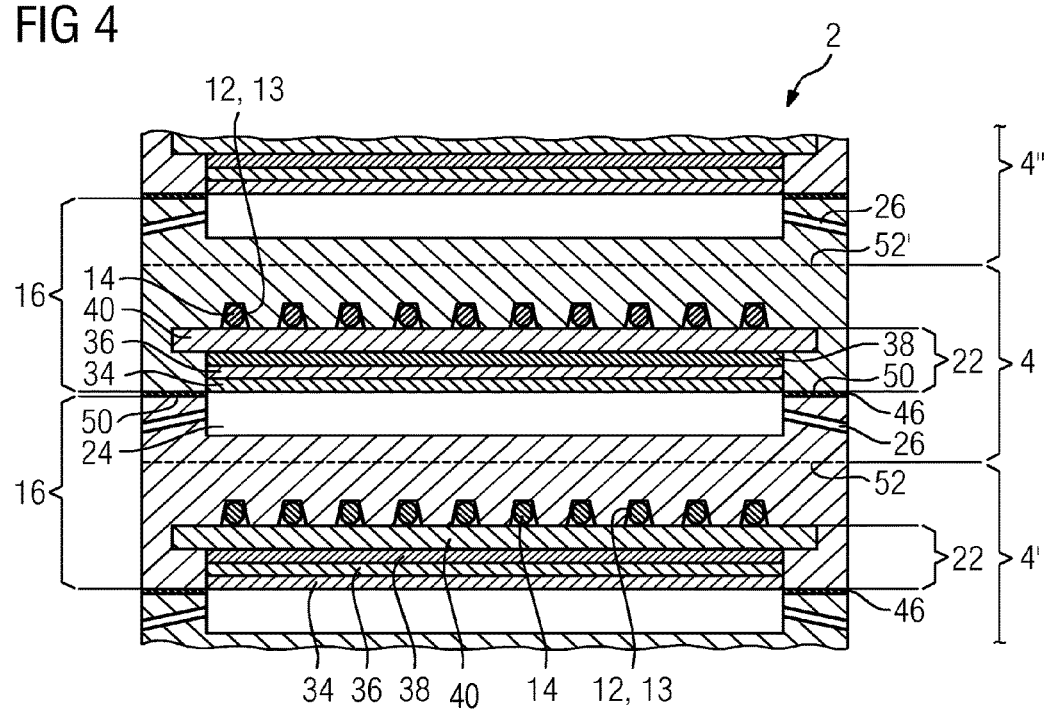
FIG. 4 shows a layer structure for the detailed illustration of a storage cell.

The recesses 56 accordingly serve to distribute the air which is introduced into the stack to the individual air channels and further to the individual storage cells, of which there may be several for each stack level (according to the example in FIG. 3 and FIG. 4 there are four storage cells per level). The recess 56' serves to collect the air which is returned from the air channels and possibly to route said air out of the stack again. In principle, the air can also be supplied once again from the recess 56' at least partially to the circuit.

The entire system for supplying air accordingly comprises the holes 60, 60', the recesses 56, 56', the holes 26 to the channels 24, the cutouts 64, 64' and also the recesses 66, 66', these together forming the air channels which are not provided with reference symbols. This entire system is called the air supply apparatus 28. The term "manifold" is also common in technical terminology.

Analogously to the air supply apparatus 28 which has just been described, the water vapor supply apparatus 70 will now be discussed further. In this respect, attention should be paid, in particular, to FIG. 3, wherein the starting point is once again the air distribution plate 48 which likewise has recesses 58, 58' by means of which water vapor or a flushing gas can be introduced into the stack through holes 62, 62'. Said water vapor is routed into cutouts 65 in the bottom plate 44 or the interconnector plate 16 by means of the recesses 58. Said cutouts 65 again form a channel, which is not provided with a reference symbol, to the water vapor line, a water vapor channel. In this case, the water vapor does not flow in the air channel like the air, but rather the water vapor is preferably stationary at an excess pressure of, for example, 20 mbar in relation to the ambient pressure. The task of the water vapor channel or the entire water vapor supply apparatus 70 is, in particular, to keep the water vapor pressure for the storage medium 14 as constant as possible. Should the water vapor pressure drop, it can be readjusted externally by the water vapor supply apparatus. The water vapor channels are, in particular, directly connected to the recesses 13 on the storage side 20 of the interconnector plate 16 and to the storage medium 14.

In respect of the water vapor atmosphere in the stack, the recesses 58, 58' in the air distributor plate 48 likewise serve to distribute water vapor to the water vapor channels of the stack which supply water vapor to each individual storage cell 4. The special feature of the air distributor plate 48 is that, in addition to the air distribution system, the water vapor distribution system is also integrated in said air distributor plate, this making the overall design of the stack less complicated and simplifying assembly.

In principle, the air distributor plate 48 does not necessarily have to comprise two or three recesses for the air supply apparatus 28 or the water vapor supply apparatus 70. Air can also be discharged from the stack 2 by means of a further plate, which is not illustrated here, on the opposite side of the air distribution plate 48. However, the design described here is highly expedient, space-saving and component-saving and very cost-effective in respect of assembly.

Figure 10:
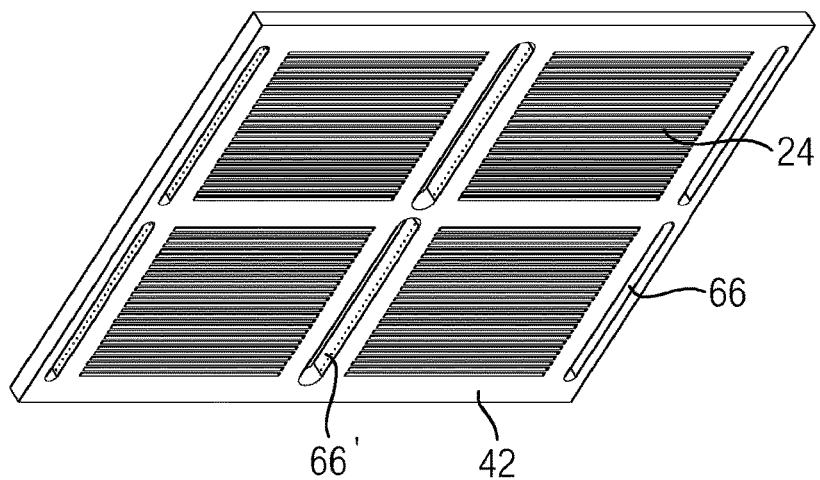
FIG. 10 shows a top plate.

FIGS. 8 and 9 once again show, in detail, an enlarged illustration of the air distribution plate 48, said illustrations being of two alternative embodiments of the air distribution plate 48 which have the same effect. FIG. 10 shows an enlarged illustration of the top plate 42.

In this case, the water vapor supply apparatus 70 comprises, in particular, the water vapor channels, not provided with a reference symbol, which are formed from the cutouts 65 in the bottom plate 44 or the interconnector plate 16, and also the recesses 58 and 58' in the air distribution plate 48 and the holes 62 in the air distribution plate 48.

The assembly of the stack 2 will now be briefly discussed in the text which follows. As already mentioned, the air distribution plate 48 is initially soldered to the bottom plate 44. These two plates now form a single cohesively connected component. The electrode structures 22, and also the seals 46, which lie on the planar faces 50, are now mounted on said component which faces upward by way of the storage side 20. These are followed by the interconnector plate 16, wherein the air side faces downward and the electrode side faces upward in this case. Said interconnector plate is in turn followed by electrode structures 22, 22' and also seals 46. Finally, after possibly further layer sequences 54 of further interconnector plates 16, electrode structures 22 and seals 46, the top plate 42 is put into position. Said stack 2 which is assembled in this way is now heat-treated at a specific temperature, preferably above 800° C. In the process, the seals 46, which comprise a glass frit for example, at least partially melt and therefore adhesively bond the individual components, that is to say the interconnector plate 16 and the top plate 42, bottom plate 44, to one another and seal off said components. In this case, the seals 46 preferably form amorphous and crystalline components at the same time, for which reason it is possible to talk of a so-called glass ceramic in this case. Screw-connection of the stack can generally be dispensed with owing to this assembly method.

The interconnector plate 16 therefore efficiently constitutes a housing plate of a cell 4 and also of a second cell 4' in each case. Said interconnector plate has planar faces 50 on each side, said planar faces being suitable for sealing off the totally integrated component, or cells 4 which are enclosed by said integrated component, in a simple and efficient manner. It should be noted here that each layer of a stack 2 can comprise a plurality of cells 4. In the present example, the structures for in each case four storage cells 4 are mounted on the bottom plate 44 or the interconnector plate 16 and the top plate 42. Each layer sequence 54 of bottom plate 44, seal 46, electrode structure 22 and the interconnector plate 16 therefore provides four individual storage cells 4, 4'.

In the illustrations according to FIGS. 2 and 3, in each case only one sequence using one interconnector plate 16 has been illustrated for reasons of clarity. It goes without saying that, in principle, the stack 2 can advantageously contain a plurality of layer sequences 54, 54' of cells 4 and 4' using a higher number of interconnector plates 16. A number of ten layer sequences 54 of cells 4, 4' with in each case two to eight cells 4 per layer sequence 54 may be expedient in this case taking into account the process-related complexity of the air distribution system.

FIG. 4 is a cross-sectional illustration of a detail of a stack 2 in the assembled state, wherein the individual layers of the electrode structure 22 are illustrated in greater detail here. However, said illustration is a highly schematic illustration which is not to be considered to be true-to-scale in any way. Dashed lines 52 are shown transversely through the layer structure according to FIG. 4, said dashed lines being provided on the outside by a curly bracket with the reference symbol 4 and 4', wherein said two dashed lines 52, 52' illustrate the termination of a cell 4 or of a layer sequence 54. In this case, the dashed lines 52 run transversely through the interconnector plate 16 which, as described, is in each case a constituent part of two successive cells 4, 4'. The description will now begin from the dashed line 52 and describe a level which runs parallel to the planar face 50 through the interconnector plate 16. The channels 24 run above the dashed line 52, said channels being connected to the air supply apparatus 28, not illustrated in FIG. 4, by means of holes 26. The air flowing through the channels 24 is in direct contact with the air electrode 34 at which oxygen atoms are ionized to form oxygen ions, said oxygen ions $O^2$ migrating through a solid-body electrolyte 36 to the storage electrode 38. The storage electrode 38, which is composed of nickel which is mixed with the yttrium-reinforced zirconium oxide for example, is mounted on a substrate structure 40 which has substantially the same chemical composition as the storage electrode 38 but differs from said storage electrode in respect of its porosity and its microstructure. The substrate structure 40 serves to carry the electrodes 34, 38 and the solid-body electrolyte 36 which have a very thin extent of a few μm. In principle, the substrate structure 40 can also be fitted on the air electrode side.

The oxygen ions are therefore brought into connection with molecular hydrogen at the porous negative electrode 38, and oxidized to form water. The water diffuses through the pores in the substrate structure 40 to the receptacle 12 for the storage medium 14. The receptacle 12 for the storage medium 14 is configured, as illustrated in further detail in FIG. 6, in the form of channel-like recesses 13. Said recesses 13 have, in particular, a depth of more than 2 mm, preferably approximately 6-10 mm. Pressed pins which are composed of iron or iron oxide are inserted into said recesses 13. Said iron or iron oxide (the oxidized or reduced state is present depending on the operating state of charging or discharging) serves as storage medium 14. Said pressed pins are of porous configuration, and therefore the water vapor can enter all pores and therefore reach all surfaces of the storage medium 14. Therefore, a water vapor atmosphere prevails in the recesses 13.

Figure 5:
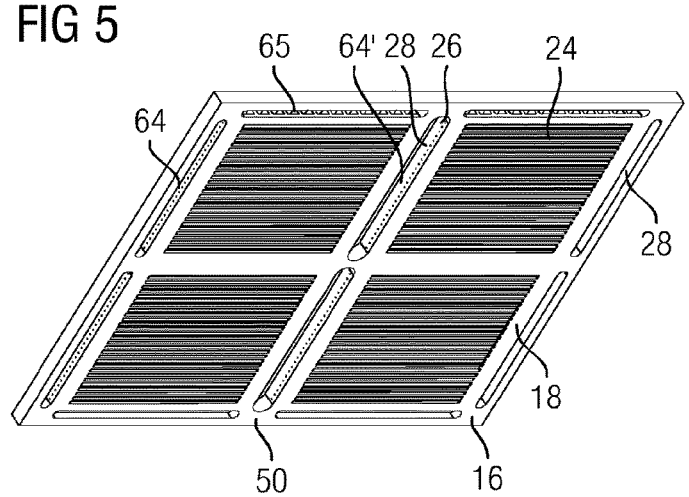
FIG. 5 shows an integrated component looking at the air supply side.

FIGS. 5-7 each show a detailed illustration of the interconnector plate 16. In this case, FIG. 5 shows a view of the air supply side 18 of the interconnector plate 16, wherein the air supply system for in each case four individual storage cells is fitted on a plate of the interconnector plate 16 in this embodiment. The air supply side 18 of the interconnector plate 16 has the individual channels 24, wherein it can be seen that the channels 24 are connected to the entire air supply apparatus 28 of the stack 2 by means of holes 26. In this embodiment, said channels are individual straight channels 24 which each have a hole 26 at the entrance and also, not illustrated here, a further hole for the outlet of air in the air supply apparatus 28 which is designated in general.

FIG. 6 shows the storage side 20 of the interconnector plate 16 which is arranged on the rear side of the air supply side 18 according to FIG. 4. The storage side likewise has channel-like recesses 13 which serve as receptacle 12 for the storage medium 14, not illustrated here. Both FIG. 5 and FIG. 6 show the planar sealing faces 50 on which the seals 46 are placed and therefore seal off each side, the air supply side 18 and also the storage side 20, from the surrounding area. It is therefore possible to achieve a high degree of sealing in the recesses 13, and therefore to ensure a constant content of water vapor in the storage medium.

FIG. 7 further shows a cross section through the interconnector plate, from which cross section the features of this illustration which are described in relation to FIGS. 4 and 5 can be understood.

The coefficient of thermal expansion of the integrated component is preferably in the vicinity of the coefficient of expansion of the substrate structure 40. The coefficient of expansion should be between $12 \times 10^{-6}$ $K^{-1}$-$14 \times 10^{-6}$ $K^{-1}$, in particular $13 \times 10^{-6}$ $K^{-1}$. A suitable material for the integrated component is therefore a ferritic steel with a chromium content of between 15% by weight and 30% by weight.

The invention claimed is:

1. A stack for an electrical energy accumulator comprising:
   at least one storage cell which in turn comprises a storage electrode and an air electrode which is connected to an air supply apparatus, and the air supply apparatus comprises an air distribution plate,
   wherein the stack additionally comprises a water vapor supply apparatus which is in contact with the storage electrode, wherein water vapor is at a stationary excess pressure in relation to an ambient pressure, and
   wherein the air distribution plate comprises:
      an air inlet configured to receive air and to deliver the air to an air inlet recess, wherein the air inlet recess is configured to move the air laterally to an air channel;
      an air outlet recess configured to receive the air from the air channel and move the air laterally to an air outlet;
      a water vapor inlet configured to receive water vapor and to deliver the water vapor to a water vapor inlet recess, wherein the water vapor inlet recess is configured to move the water vapor laterally to a water vapor channel; and
      a water vapor outlet recess configured to receive the water vapor from the water vapor channel and to move the water vapor laterally to a water vapor outlet.

2. The stack as claimed in claim 1, further comprising a bottom plate and at least one interconnector plate, said plates each having at least two vertically continuous cutouts which, when the plates are stacked, each form the air channel and the water vapor channel in the stack.

3. The stack as claimed in claim 2, wherein at least two water vapor channels are provided, said water vapor channels being connected to in each case one recess.

4. The stack as claimed in claim 1, further comprising a top plate, said top plate being connected to the air electrode.

5. The stack as claimed in claim 4, wherein the top plate has recesses which are connected to the air channel and at least one hole of which leads to an additional channel which is in direct contact with the air electrode.

* * * * *